United States Patent Office 3,286,770
Patented Nov. 22, 1966

3,286,770
METHOD OF TREATING WELLS
John A. Knox and Reginald M. Lasater, Duncan, Okla., assignors to Halliburton Company, Duncan, Okla., a corporation of Delaware
No Drawing. Filed May 25, 1965, Ser. No. 458,772
10 Claims. (Cl. 166—42).

This application is a continuation-in-part of U.S. patent application Serial No. 140,190, now abandoned, filed September 25, 1961, which is a continuation-in-part of U.S. patent application Serial No. 40,515, filed July 5, 1960, now abandoned, and is entitled to all the benefits and rights of said earlier filed applications as to all common subject matter.

This invention relates generally to the treating of wells and, more particularly, to compositions and methods useful in treating underground well structures to render surfaces thereof water-repellent or preferentially oil-wettable.

It is anticipated that the invention will be most widely applied in connection with operations performed on disposal and injection wells wherein water or other aqueous fluid is to be injected into the treated zone or formation. In these and other instances it has been found desirable for the surfaces past which the aqueous fluid is conducted to be water-repellent, in order to facilitate or increase the fluid movement, such as into and through the pore spaces and openings providing fluid passageways in the treated zone for formation, which is commonly a permeable rock or sand structure.

While various proposals have been made heretofore to render surfaces in wells preferentially oil-wet, these have commonly provided only temporary water-repellency, such as by using surface active or wetting agents which become adsorbed on surfaces of the permeable structure to be treated but which do not actually react chemically therewith. In some instances the effect of these agents has been lost due to the agent being washed away relatively rapidly when water or other aqueous fluid is subsequently flowed or conducted therepast. At times the prior art agents have been introduced into wells in oily carrying fluids which are difficult to use advantageously in water wells, due to remaining in the well and forming plugging or blocking deposits. For example, emulsification has occurred between the oil present in the carrying fluid and water present or introduced into the well. This emulsification may occur, for example, when water is subsequently introduced during the course of operating a water disposal or injection well.

One object of the present invention is to provide an improved treating agent and an improved method using the same in rendering surfaces water-repellent or preferentially oil-wettable.

Another object of the invention is to provide an improved treating agent and method useful in rendering surfaces water-repellent or preferentially oil-wettable for much longer periods of time than with certain prior art practices.

Another and more specific object of the invention is to provide an improved treating agent and method for use in rendering the surfaces of a rock or sand structure water-repellent or preferentially oil-wettable.

Another specific object of the invention is to provide an improved treating agent and method for use in well operations wherein it is desired to render the surfaces of a permeable zone or formation in the well water-repellent or preferentially oil-wettable, such as to facilitate the movement of water or other aqueous fluid therepast.

A further specific object of the invention is to provide an improved treating agent and method especially useful in water disposal or injection wells for rendering water-repellent the surfaces of a permeable structure therein, such as surfaces of rock or sand zone or formation into and through which water is conducted during the course of operating the well.

Yet a further object of the present invention is to provide a new and improved treating agent for water injection, water disposal wells, and/or water wells consisting essentially of an organohalogensilane or ester thereof, or mixtures of either or both, and a water soluble solvent which is substantially non-reactive or inert with the organo silane compound.

Yet a further object of the present invention is to provide a new and improved method of treating water injection, water disposal wells, and/or water wells, whereby an organohalogensilane compound, which does not form a precipitate upon hydrolysis with water, is used to render the well formation substantially permanently preferentially oil-wettable.

The foregoing and additional objects and advantages are attained, in accordance with the invention, by utilizing a treating fluid comprising a treating agent and a carrier therefor, wherein a liquid organohalogensilane or ester thereof, which does not form a precipitate upon hydrolysis with water, is the treating agent and a water soluble anhydrous solvent which is substantially inert or non-reactive with the silane is the carrier.

The present invention is specifically adapted for treating formations having no oil present, and one in which no oil is to subsequently come in contact therewith. The formation to be treated should be water wet, and if the formation is not water wet, it should be rendered water wet prior to carrying out the treating method of this invention.

The organohalogensilanes or esters thereof suitable for use in the instant invention are those which do not form a precipitate upon hydrolysis with water. Some examples of suitable organohalogensilane compounds are the alkylhalogensilanes, e.g., amyltrichlorosilane, ethyltrichlorosilane, methyltrichlorosilane, trimethylchlorosilane, dimethyldichlorosilane, methyltribromosilane, dimethyldibromosilane and trimethylbromosilane; the alkenylhalogensilanes, e.g., vinyltrichlorosilane; the arylhalogensilanes, e.g., diphenyldichlorosilanes, phenyltrichlorosilane, and diphenyldibromosilane; the alkylorganosilane esters, e.g., amyltriethoxysilane, ethyltriethoxysilane, methyltriethoxysilane, and dimethyldiethoxysilane; the alkenylorganosilane esters, e.g., vinyltriethoxysilane; and the arylorganosilane esters, e.g., diphenyldiethoxysilane and phenyltriethoxysilane.

It should be noted that mixtures of the above organohalogensilanes and/or esters thereof may be used without departing from the scope of the invention. Generally, the organohalogensilanes are preferred over the esters thereof because of their faster reaction in hydrolyzing. There are of course some situations in which it would be more desirable to have a slower rate of hydrolysis and the esters of such organohalogensilanes would therefore be preferred. The chlorosilanes are generally preferable, because of their more readily commercial availability.

The organohalogensilane used in the present invention is one which is in a liquid state or one which may readily go into solution in a suitable liquid carrier. Although organohalogensilanes which have relatively low boiling points (about 70° F. to 150° F.) may be used, especially in cool or cold weather, it is normally preferred that such silanes have a boiling point of about 150° F. or more.

The organohalogensilanes most suitable for use in this invention are those having a general formula $$R_n—Si—X_{n'}$$

wherein R may be an alkyl, alkenyl or aryl group having from 1 to 18 carbon atoms; $n$ may be from 1 to 3, $n'$ may be from 1 to 3, and $n+n'$ equals 4; and X may be a hydrogen or halogen, but silane must have at least one halogen.

The esters of the organohalogensilanes most suitable for use in the invention are those having the general formula $R_n-Si-(OR')_{n'}$, wherein R and R' may be an alkyl, alkenyl or aryl group having from 1 to 18 carbon atoms; $n$ may be from 1 to 3; $n'$ may be from 1 to 3, and $n+n'$ equal 4; O is oxygen and (OR') may be a hydrogen, but the ester must have at least one OR' group. R may also be an OR' group.

The organohalogensilane of the present invention as set forth hereinabove is dissolved in a water soluble anhydrous solvent or carrier which carrier is substantially inert or non-reactive with the organohalogensilane. For best results, there should be little or no reaction of the solvent with the silane. This assures that the reaction of the silane will occur when the treating fluid is placed in the formation to be made preferentially oil-wettable.

Suitable carriers or solvents are alcohols, e.g., isopropyl alcohol, ethyl alcohol and methylalcohol; ketones, e.g., acetone, and methyl ethyl ketone; amides, e.g. formamide; and anhydrous organic acids, e.g., glacial acetic acid, formic acid and acetic anhydride. Any other suitable water soluble, anhydrous solvent which is substantially non-reactive with the organohalogensilanes or esters thereof may be used.

As stated hereinabove, when a surfactant is used as a treating fluid such surfactant is adsorbed on the surface of the sand or formation and there is a very weak attachment or bonding as compared to that which occurs in a chemical reaction. The energy which holds the surfactant on the solid surface of the formation is usually less than 10 kilocalories/mole. This means that the surfactant may be easily removed by washing with a solvent.

In the case of the well treating fluid of the present invention, there is an actual chemical reaction of the silane material with the surface of the sand or formation which firmly attaches such material to the sand. This bond energy is on the order of 100 kilocalories/mole, thereby allowing a nearly permanent attachment.

The following illustrates the reaction of an organohalogensilane with silica surfaces or sand:

(a) If the silica has a layer of water on the surface there are two reactions which occur (1)

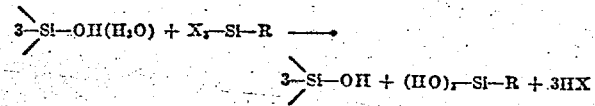

then (2)

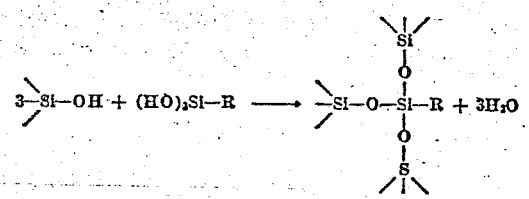

(b) If the silica surface is free of water then the reaction is

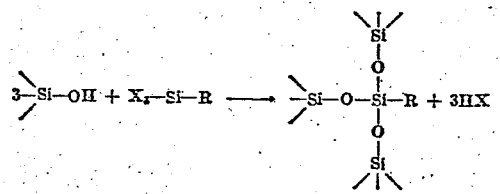

In the first equation the sand reacts with the silane to form a silanol and water. The silanol hydrolyzes, as seen in Equation 2, to form the sand or silica polymer which creates the chemical bond and water. In Equation 3, the silane reacts directly with the silanol group to form the bonding polymer and an acid.

In one way of proceeding in the present invention, the treating fluid is prepared by dissolving a quantity of amyl trichlorosilane in a suitable solvent, such as isopropyl alcohol or acetone.

While the invention is not limited to any particular theory of behavior of the ingredients, it is believed that the solvent-silane system should be kept as free of water as possible until it is introduced into the well and reaches the zone or formation to be treated. This precaution is to prevent premature hydrolysis of the silane material.

In introducing the treating fluid into a well, such as into a water disposal or injection well, quantities of the solvent alone or some other suitable fluid may advantageously be introduced as a blanketing or flushing fluid. The blanketing fluid may be used ahead of and behind the solvent-silane solution to assist in isolating the treating fluid from water and other contaminating substances which may be encountered in the well.

The blanketing or flushing fluid used as a spear-head or tail-in removes and displaces any interstitial water, but permits a film of water to be retained on the sand. This blanket enables the silane to be properly placed without adverse effects such as a premature reaction of the silane with interstitial water.

If desired, one or more separators in the form of well plugs or the like may be introduced and moved or forced downwardly into the well. For example, the treating fluid and perhaps also the blanketing fluid may be introduced between top and bottom plugs which eventually come to rest in the well. The top plug may be followed by a quantity of a displacing fluid, which may be water pumped into the well tubing or other conduit to move or force the plugs and treating fluid downwardly into the well.

In order to isolate the treating fluid and facilitate its injection, well packers may be employed at one or both locations above and below the section of well strata to be treated. Where there is a zone or formation of considerable vertical dimension, best results will be obtained by treating relatively short sections thereof while isolated by well packers or the like. While any of various straddle packer arrangements may be employed, it is preferred to use a combination tool which provides relatively close spacing of the top and bottom packers and permits ready movement of the whole tool when it is desired to treat a different section. This type of tool is well known in the oil fields and, accordingly, it is believed unnecessary to give a full description herein.

If desired, the treating fluid can be spotted at the desired depth in the well and then slowly squeezed into the zone or formation or section thereof to be treated. Where this procedure is followed, it is recommended that care be taken to avoid premature overdisplacement of the treating fluid into the well strata. More particularly, it is recommended that the treating fluid, after introduction thereof into the well strata, be allowed to remain relatively near the bore of the well for a sufficient period of time to allow the silane material to reach and react with as much as possible of the exposed or accessible sand and like substances in the section to be treated.

To this end, the well may advantageously be closed in for several hours or the treating fluid may otherwise be caused or allowed to remain in the well strata in the vicinity of the well bore for a period of time prior to displacing or removing the excess fluid. In any event, where the well is a water disposal or injection well, it is recommended that a delay occur following the treatment and prior to commencing or resuming the injection of water or otherwise operating the well.

It is believed unnecessary to attempt to recover the treating fluid from the well, particularly where water or other aqueous fluid is to be injected into the treated zone or formation after the treatment thereof.

The amount of treating fluid to be used in any particular well will, of course, depend upon several factors.

For best results, it is believed that some attempt should be made to estamiate or measure the dimensions of the zone or formation to be treated, whereupon an estimate can be made as to the amount of treating agent or silane likely to be required.

For example, it is believed that 1 gram molecular weight of the silane material will cover approximately 1,100 square meters surface area. It is estimated that a section of well formation one foot thick and two feet in diameter will have a surface area of about 34,000 square meters, assuming 36 percent porosity and 100 millidarcies permeability. In this instance, it is believed that approximately 6,750 grams or 15 pounds of amyl trichlorosilane would be needed for full treatment. This amount of treating agent could be mixed with an amount of solvent (about 7 gallons) estimated to equal the pore volume of the section to be treated. The resulting treating fluid could then be applied, as aforesaid, by introducing it between blanketing fluids. Alternatively, the treating fluid could be injected into the well strata using any of various equivalent procedures, such as by lowering it in a dump bailer or otherwise employing suitable tools for placing the fluid at the desired location in the well.

Concentrations (wt. percent) of silane solution used will vary depending on the particular silane used. This is determined by the number of gram-moles required to treat the exposed rock. The above sample shows 32.9 gram-moles is needed (15 lbs.) of amyl trichlorosilane to treat the given formation. When dissolved in enough solvent to fill the pore spaces this gives a 30.4% by weight solution. Following the same procedure for trimethyl chlorosilane gives 16.5% and for diphenyl diethoxy silane, 35.2%. It is not possible to determine, with any degree of certainty, how much dilution is obtained with water in the formation. There should be very little, however, because the bulk of the water will be displaced ahead of the treating solution. It is believed that not more than about 30% of the water will be retained and this would dilute a 33% solution of silane to about 30% by weight.

The concentrations shown hereinabove are based on the condition that the zone in question is to be entirely treated with silane with one pore volume of fluid. The concentrations can be reduced by using more than one pore volume. Thus, concentration limits can be from 1% to 50% by weight with the preferred range being 15–35%.

Laboratory tests have been conducted for the purpose of comparing the flow rate of water through untreated sand packs with the flow rate of water through otherwise similar sand packs which had been first treated, in accordance with the invention, to render the surfaces thereof water-repellent or preferentially oil-wettable. Also, measurement was made of the flow rate of kerosene through the treated and untreated sand packs after water had passed therethrough. Subsequently, measurement was made of the flow rate of additional water which was passed through the sand packs after the kerosene, in order to compare the effect of the kerosene on the treated and untreated sand packs.

In preparing for these tests, a quantity of Oklahoma #1 dry sand was first treated, in accordance with the invention, using a 0.2 percent by weight solution of diethyl diethoxy silane in acetone. The sand was covered with the treating solution, agitated slightly, and then allowed to remain in contact with the solution for approximately 1 hour. Next, the excess liquid was decanted and the sand was dried at 110 degrees centigrade for approximately 16 hours. Independent tests showed that sand treated in this manner is very preferentially oil-wettable.

The treated sand, after drying, and a quantity of otherwise similar but untreated, dry sand were used in preparing the treated and untreated sand packs.

In preparing each of the sand packs, 40 cc. of sand was added to a glass tube. The sand pack was then tested in an attempt to determine the uniformity of packing of the sand. This was done by adding 50 cc. of water which was allowed to pass through the sand under gravity flow conditions, with the time required for the quantity between 10 cc. and 20 cc. passing through the pack being measured. As each sand pack was prepared, it was similarly tested.

After preparing the sand packs, each was then supplied with 40 cc. of water which was placed on top of the sand. A pressure line was connected to the top of the flow column. The pressure was adjusted by means of a pressure regulator and mercury manometer to a pressure differential of 5.2 cm. of mercury which is approximately equal to 1 p.s.i. The flow rate of the water through the sand pack was then measured and recorded. The tests were repeated using additional water. Then the tests were repeated on both sand packs using kerosene instead of water. The tests were repeated on the sand packs using water and finally with water once again. The results of these tests are shown in Table I.

TABLE I

[Flow rates through column (cc./sec.)]

| Test Fluid | Untreated Sand Pack | Diethyl Diethoxy Silane Treated Sand Pack |
|---|---|---|
| Water | .814 | .928 |
| Do | .778 | .872 |
| Kerosene | .147 | .139 |
| Water | .350 | .369 |
| Do | .331 | .450 |

It can readily be seen that water passes more freely through the treated sand pack than through the untreated sand pack. Upon the basis of these results and others, it is believed that the flow rate of water through treated sand can be expected to average about 26 percent greater than through similar sand which has not been treated to make it water-repellent or preferentially oil-wettable.

With regard to the tests first using water, it is emphasized that the treated sand is not oil-wet in the sense of being in contact with oil. That is, no oil is actually in contact with the treated sand. Rather, the sand is "coated" with a silicone type material which renders the surfaces water-repellent and preferentially oil-wettable.

On the other hand, in the test using water after having previously used kerosene, the treated sand pack has now become oil-wet, whereas the untreated sand pack is still preferentially water-wet, which is the usual condition of untreated sand surfaces. While in such test the untreated sand pack contains residual oil, due to having been in contact with the kerosene of the prior test, the oil-wet treated sand pack contains excess oil contamination, which explains the lower water flow rates therethrough in these subsequent water tests.

In this latter connection, however, it is pointed out that the contamination of the treated sand with oil can be remedied. That is, it is possible to wash the oil-wet sand with water containing soap or a surfactant and thereby remove the excess oil. However, the introduction of oil into treated formations is to be avoided where maximum benefits from the treatment are desired.

In additional tests, the oil wetting of sand by diethyl diethoxy, amyl triethoxy, and amyl trichloro silane was determined visually. The flow of water through amyl triethoxy silane treated sand was measured and compared with that of the other two silanes. These results are set forth in Table II hereinbelow:

TABLE II

| | Oil Wetting | Water Flow Rate (cc./sec.) |
|---|---|---|
| Amyl trichloro silane | Very oil wet | 1.200 |
| Diethyl diethoxy silane | Slightly oil wet | .928 |
| Amyl triethoxy silane | Very slightly oil wet | .842 |
| Untreated | | .814 |

Thus, it appears that the water flow rate is dependent upon the degree of oil wetting afforded by the silane. The increase in flow rate above that of the water wet sand is as follows:

| | Percent |
|---|---|
| Amyl trichloro silane | 47.5 |
| Diethyl diethoxy silane | 14.0 |
| Amyl triethoxy silane | 3.4 |

The results of the tests also show that the flow rate of oil through water wet sand is greater than through oil wet sand, in keeping with accepted thoughts on the effect of wettability on flow. This work also revealed that the degree of oil wetting varied with the particular silane used. Amyl trichloro silane oil wets better than diethyl diethoxy silane which is in turn better than amyl triethoxy silane.

TABLE III

Procedure

Solutions of the silane esters (obtained from Union Carbide, Silicones Division) were prepared in acetone using 3 cc. of silane and 10 g. acetone (33% solution).

Two cubic centimeters of solution were added to bottles containing 50 cc. water and capped. The bottles were allowed to stand for 24 hours with occasional shaking. The results are as follows:

Results

| Chemical: | Appearance after 24 hours |
|---|---|
| A-15 ethyl triethoxy silane | Clear solution, oil on top, no solids. |
| A-16 amyl triethoxy silane | Clear solution, oil on top, no solids. |
| A-151 vinyl triethoxy silane | Solution slightly cloudy, oil on top, no evidence of solids. |
| A-153 phenyl triethoxy silane | Clear solution, oil on top, no solids. |
| A-164 dimethyl diethoxy silane | Solution clear, no oil layer detected. |

The glass containers were water repellent at the end of the tests with A-164 being the most water repellent.

Conclusions

Hydrolysis of ethyl triethoxy silane, amyl triethoxy silane, vinyl triethoxy silane, phenyl triethoxy silane, and dimethyl diethoxy silane in water for 24 hours did not produce evidence of solids precipitating. The mixtures of silane and water had an oily layer on top of the aqueous phase at the end of the test with one exception. Dimethyl diethoxy silane upon hydrolysis apparently forms a water soluble product as there was no oily layer present.

TABLE IV

Procedure

The silane esters were purchased from Peninsular Chemresearch Company. Solutions were prepared by dissolving 3 cc. of silane in 10 g. acetone (33% solution). Two cubic centimeters of solution were added to flasks containing 50 cc. water and the flasks stoppered. The flasks were allowed to stand for 24 hours with occasional shaking.

All glass containers were used in these tests.

Results

| Chemical: | Appearance after 24 hours |
|---|---|
| Trimethyl ethoxy silane | Oil layer on top of water, no solids. |
| Diethyl diethoxy silane | Oil layer on top of water, no solids. |
| Diphenyl diethoxy silane | Liquids drops on bottom of water, no solids. |

The flasks showed evidence of being water repellent, thus indicating that hydrolysis had taken place.

Conclusion

Hydrolysis of diphenyl diethoxy silane, trimethyl ethoxy silane, and diethyl diethoxy silane resulted in mixtures containing only liquid products. There was no evidence of solids being formed in the tests.

While the treated sand used in the laboratory tests was first dried using applied or external heat, as hereinbefore pointed out, prior to being placed in the glass tubes, this step was to assure uniformity of wetting and will not be necessary in actual field operations. Rather, as hereinbefore indicated, the solvent-silane solution used in treating the strata and other surfaces in the well may, after allowing sufficient time for the chemical reaction of the silane material with the rock or sand and like material in the well, be flushed or displaced directly with the water or other fluid subsequently introduced or otherwise conducted past the treated surfaces.

Where the water-repellent surfaces which result from treating the underground strata with the silane material are rendered preferentially oil-wettable without actually being oil-wet, it will ordinarily be unnecessary to use soap or surfactant to flush or wash away the excess treating fluid. However, should oil contamination occur for some reason, such as during the subsequent operation of the well, an aqueous soap or surfactant solution may advantageously be used in washing away the oil to restore the water-repellency of the treated surface. This may be done, as desired, to facilitate the flowing of water past the treated surfaces, such as during the course of subsequently operating the well as a water disposal or injection well.

While the invention has been described herein with particular reference to certain details thereof, it is understood that these are by way of example, the scope of the invention being best defined in the appended claims.

What is claimed is:

1. A method of treating non-oil-bearing water-wet earthen formations for increasing the flow rate of water therethrough, comprising the steps of:
   (a) injecting into said formation a well treating solution, said solution consisting essentially of:
      (1) a treating agent, which does not form a precipitate upon hydrolysis with water, selected from the group consisting of the organohalogensilanes, the organosilane esters, and mixtures thereof, and
      (2) a water soluble anhydrous solvent which is substantially non-reactive with said treating agent;
   and thereby rendering said formation preferentially oil-wettable; and
   (b) flowing water through the treated formation at a rate greater than that possible through an untreated formation of like composition and under like conditions.

2. The method recited in claim 1, wherein said treating agent is amyltrichlorosilane.

3. The method recited in claim 1, wherein said solvent is selected from the group consisting of iso-propyl alcohol, acetone, formamide, and glacial acetic acid.

4. The method recited in claim 1, wherein said solvent is selected from the group consisting of alcohols, ketones, amides, and anhydrous organic acids.

5. A method of treating a non-oil-bearing water-wet permeable rock or sand structure for increasing the flow rate of water therethrough, comprising the steps of:
   (a) injecting into said structure a solution of a water soluble anhydrous solvent and a treating agent, substantially non-reactive therewith, which does not form a precipitate upon hydrolysis with water, selected from the group consisting of the alkylchlorosilanes, the alkenylchlorosilanes, the arylchlorosilanes, the alkylarylchlorosilanes, the alkylorganosilane esters, the alkenylorganosilane esters, the arylorganosilane esters, the alkylarylorganosilane esters, and mixtures thereof, thereby rendering said structure preferentially oil-wettable; and (b) flowing water through the treated structure at a rate greater than that possible through an untreated structure of like composition and under like conditions.

6. A method of treating water disposal and water injection wells to render water-wet strata therein preferentially oil-wettable to thereby increase the flow of water therethrough, comprising the steps of:

(a) introducing into the well a solution of a water soluble anhydrous solvent and a treating agent, substantially non-reactive therewith, which does not form a precipitate upon hydrolysis with water, selected from the group consisting of the alkylchlorosilanes, the alkenylchlorosilanes, the arylchlorosilanes, the alkylarylchlorosilanes, the alkylorganosilane esters, the alkenylorganosilane esters, the arylorganosilane esters, the alkylarylorganosilane esters, and mixtures thereof;

(b) causing said solution to contact a section of the well strata to be treated, thereby rendering such said section preferentially oil-wettable;

(c) thereafter displacing from the treated section any remaining portion of said solution; and, (d) flowing water through the treated strata at a rate greater than that possible through an untreated strata of like composition and under like conditions.

7. A method of treating non-oil-bearing water-wet earthen formations in water disposal wells, water injection wells and water producing wells for increasing the flow of water therethrough, comprising the steps of:

(a) introducing a blanketing fluid into the well;
(b) introducing a treating fluid into the well immediately behind said blanketing fluid, said treating fluid consisting essentially of:

(1) a liquid treating agent, which does not form a precipitate upon hydrolysis with water, selected from the group consisting of the organohalogensilanes, and mixtures thereof, and (2) a water soluble anhydrous solvent which is substantially inert with said treating agent; and, thereby rendering the formation contacted thereby preferentially oil-wettable;

(c) introducing a blanketing fluid immediately behind said treating fluid, thereby isolating said treating fluid from water and other contaminating substances which may be encountered in the well; and (d) flowing water through the treated formation at a rate greater than that possible through an untreated formation of like composition and under like conditions.

8. The method of claim 7, wherein said blanketing fluid is a water-soluble solvent selected from the group consisting of alcohols, ketones, amides and anhydrous organic acids.

9. The method of claim 7, wherein said treating agent is amyltrichlorosilane.

10. The method of claim 7, wherein said solvent is selected from the group consisting of iso-propyl alcohol, acetone, formamide and glacial acetic acid.

References Cited by the Examiner
UNITED STATES PATENTS

| | | | |
|---|---|---|---|
| 2,265,962 | 12/1941 | Bent et al. | 166—42 X |
| 2,469,354 | 5/1949 | Bond | 166—9 X |
| 2,633,919 | 4/1953 | Bauer et al. | 166—42 X |
| 2,846,012 | 8/1958 | Lorenz et al. | 166—38 |

CHARLES E. O'CONNELL, *Primary Examiner.*

T. A. ZALENSKI, *Assistant Examiner.*